United States Patent [19]
Lehrman

[11] 3,804,432

[45] Apr. 16, 1974

[54] COLLAPSIBLE CART
[75] Inventor: David Lehrman, Cheltenham, Pa.
[73] Assignee: The Ironess Company, Philadelphia, Pa.
[22] Filed: July 10, 1972
[21] Appl. No.: 270,112

[52] U.S. Cl............ 280/36 C, 280/47.19, 280/47.33
[51] Int. Cl.............................................. B26b 1/00
[58] Field of Search........... 280/36 C, 47.19, 47.26, 280/DIG. 4, 47.33

[56] References Cited
UNITED STATES PATENTS
2,212,053  8/1940  Smith........................... 280/DIG. 4
3,052,484  9/1962  Huffman........................ 280/36 C
2,901,262  8/1959  Berlin........................... 280/DIG. 4
2,835,503  5/1958  Humpheries.................... 280/47.19

Primary Examiner—Robert R. Song
Attorney, Agent, or Firm—Seidel, Gonda & Goldhammer

[57] ABSTRACT

A collapsible cart is provided having upper and lower supports which may be moved between operative and inoperative positions. A laundry basket or the like may be supported on each support. Each support includes means to prevent undesired movement of the laundry basket. A utility receptacle may also be secured to the collapsible cart.

8 Claims, 3 Drawing Figures

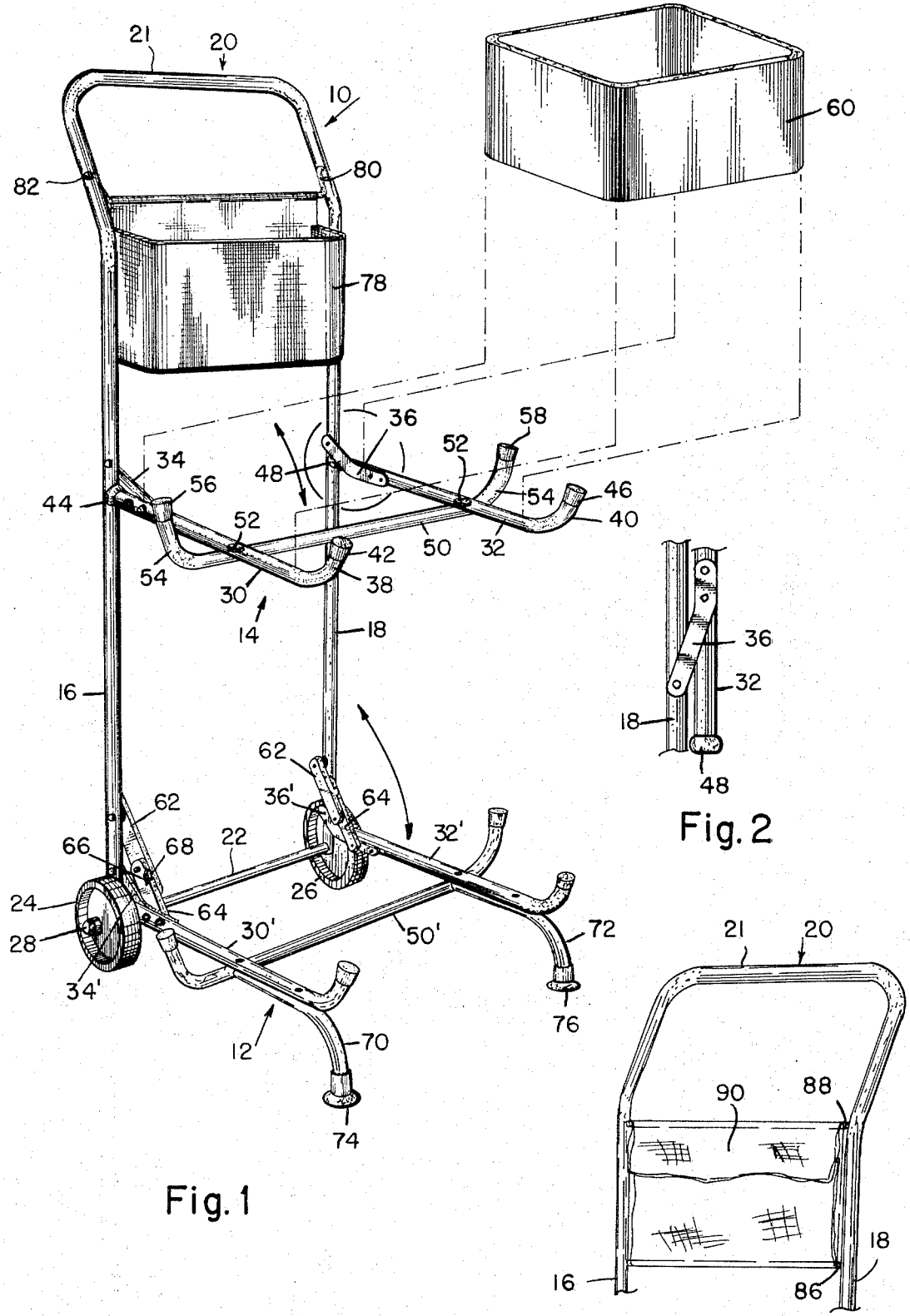

ND, 432

COLLAPSIBLE CART

This invention relates to a collapsible cart and more particularly to a collapsible cart having upper and lower supports for supporting laundry baskets or the like.

Collapsible carts have met with increasingly popularity. Collapsible carts are easily stored and may be used for many purposes. See, for example, Item No. 3 on Page 1220 of the Spring through Summer 1970 issue of the Sears Catalog. In general, existing carts are not sufficiently versatile and do not provide adequate means for securely retaining the items carried thereon.

The collapsible cart of the present invention overcomes the deficiencies of the prior art. The cart includes upper and lower supports to provide increased versatility. While the cart may be used for numerous purposes including shopping and the like, it is particularly adapted for use as a carrier for laundry baskets. Two laundry baskets can be stored on the cart using the same floor space normally used to support a single laundry basket.

Housewives are familiar with the necessity of using two laundry baskets which permits sorting various articles of clothing to be cleaned. One of the baskets can be used for white articles of clothing while the other basket used for colored articles of clothing. Alternatively, one basket can contain clean clothes while the other basket contains soiled clothes.

The collapsible cart includes means preventing the basket from falling from the spaced supports. Each basket must be lifted slightly before it can be removed from its respective support. The positive basket engagement means prevents each basket from sliding off its respective support.

A convenient receptacle is provided adjacent the uppermost end of the cart. The receptacle can be connected to the cart immediately below the handle by any conventional desired suitable means. The receptacle can be used to store spray starch, clothes pins, a sprinkler bottle, sponges, an apron, or the like. If the collapsible cart is used for transporting groceries, perishables or easily bruised or damaged food items such as grapes, bananas or the like may be stored in the upper receptacle. The upper receptacle may be a rigid member or may be a cloth bag. Additionally, the upper receptacle may be provided with a cover to enhance the appearance of the collapsible cart.

If desired, a support table may also be connected to one of the uprights of the collapsible cart similar to the table shown in my U.S. Pat. No. 3,447,488.

For the purpose of illustrating the invention, there are shown in the drawings forms which are presently preferred; it being understood, however, that this invention is not limited to the precise arrangements and instrumentalities shown.

FIG. 1 is a perspective view of a collapsible cart showing my invention;

FIG. 2 is an enlarged detail view of the portion of the laundry cart circled in FIG. 1 showing the upper support in inoperative position; and FIG. 3 is a partial perspective view showing an alternate form of utility receptacle which can be secured to the collapsible cart.

Referring now to the drawings in detail wherein like numerals indicate like elements throughout the several views there is shown in FIG. 1 a collapsible cart generally indicated by reference numeral 10. The cart 10 includes a lower support 12 and an upper support 14 shown in their operative position.

The cart 10 includes a pair of parallel uprights 16 and 18 integrally connected by a U-shaped member 20. As shown in FIGS. 1 and 3, the U-shaped member 20 is at an angle with respect to the vertical uprights 16 and 18. Additionally, the horizontal rod portion 21 of member 20 provides a convenient handle to facilitate movement of the cart 10.

A rod 22 extends through suitable openings adjacent the lowermost ends of the uprights 16 and 18. Wheels 24 and 26 are secured to opposite ends of the rod 22 and rotate with respect thereto. The wheels 24 and 26 may be conventional. The wheels 24 and 26 may be secured to the rod 22 by means of any conventional force fitted cap 28 or the like.

As shown in FIG. 1, the upper support 14 includes a pair of outwardly extending tubular rods 30 and 32. Clevises 34 and 36 interconnect rods 30 and 32 to uprights 16 and 18, respectively. Rods 30 and 32 have upwardly turned ends 38 and 40, respectively. Rod 30 is provided with end caps 42 and 44 in order to enhance the attractiveness of the cart and to prevent the ends of the rod from being exposed. The rods 30 and 32, the uprights 16 and 18 and the U-shaped member 20 may be composed of tubular aluminum or like material. End cap 44 may be cupped so that it conforms to and engages the tubular upright 16 when the support 14 is in the operative disposition shown in FIG. 1.

Rod 32 includes end caps 46 and 48. Again, end cap 48 may have a cupped face identical to end cap 44.

A cross rod 50 may be suitably secured by rivets 52 to the underside of rods 30 and 32. The cross rod 50 may also be made of tubular aluminum or the like and is provided with upturned ends 54 and end caps 56 and 58. A basket 60 or the like is shown separate and apart from the cart 10 for purposes of clarity. The broken lines indicate the path of movement the basket 60 may take to be placed upon the upper support 14. The basket 60 may be a laundry basket, a carton adapted to contain food, or the like. The cart is adaptable for numerous uses and has great versatility. The upturned ends 38 and 40 of rods 30 and 32 prevent basket 60 from sliding forwardly from upper support 14. The uprights 16 and 18 prevent the basket from shifting rearwardly. The upturned ends 54 of cross rod 50 prevent the basket 60 from shifting laterally with respect to upper support 14. The rods 30 and 32 provide support for the basket 60. Cross rod 50 provides additional support for the basket and provides reinforcement for the rods 30 and 32 so that greater loads can be accepted by upper support 14.

Lower support 12 is identical to upper support 14 except as will be made clear hereinafter. Accordingly, like structure with respect to lower support 12 has been indicated by prime notation of the same reference numerals used with respect to upper support 14.

In addition to clevises 34' and 36' securing rods 30' and 32' to uprights 16 and 18, there is provided a pair of links 62 and 64, pivoted at adjacent ends. The links 62 and 64 are pivoted at their distal ends to the clevises 34' and 36' and the uprights 16 and 18, respectively as shown. The link 64 is provided with a notch 66. The link 62 is provided with a positive locking detent 68 which cooperates with notch 66. The links are provided to positively lock the lower support 12 in its operative position. In this manner, the lower support 12 can not be moved to its inoperative position without manually unlocking links 62 and 64.

The lower support 12 also includes curved support legs 70 and 72. Legs 70 and 72 include flared end caps 74 and 76 respectively which are adapted to engage the floor when the cart is stationary. As is apparent, it is merely necessary to tilt the cart slightly so that it rides on wheels 24 and 26 so that it may be moved to any desired location. The handle 21 provides a convenient means for tipping and thereafter guiding movement of the cart 10.

Another basket or the like (not shown) similar to basket 60 is adapted to be supported on lower support 12. It is apparent from the above discussion that the basket will be prevented from inadvertently slipping off of lower support 12 by uprights 16 and 18, upturned ends 38' and 40' and upturned ends 54'.

A general utility receptacle 78 is shown secured to the U-shaped member 20. A bail member 80 is secured to the uppermost end of the receptacle 78 and is connected to the U-shaped member 20. The bail member 80 may extend through the tubular member 20 and be secured thereto by rivets such as rivet 82. Alternatively, the bail member 80 may be made of spring metal so that the ends thereof are urged into holes provided only on the inner face of the U-shaped member 20.

The receptacle 78 may be composed of rigid plastic material so that it may receive laundry items or, when the cart is used to transport groceries, perishable or fragile food items.

An alternative receptacle 84 is shown in FIG. 3. The receptacle 84 may be made of soft fabric or the like. A lower rod 86 and an upper rod 88 secure the receptacle 84 to the uprights 16 and 18. The receptacle 84 is provided with a flap or lid 90. The flap 90 may be closed to enhance the overall appearance of the receptacle. The rods 86 and 88 may be secured to the uprights 16 and 18 in any desired manner.

When the cart 10 is in use, the support 12 and 14 are placed in their generally horizontal operative positions. When it is desired to store the cart, the upper support 14 is merely pivoted so that the rods 30 and 32 are moved to a generally vertical disposition. The disposition of rod 32 with respect to upright 18 when the support 14 is in its inoperative position is shown in FIG. 2. The links 62 and 64 are manually moved to separate detent 68 from notch 66 and the lower support 12 is also pivoted to its inoperative position. In this manner, the collapsed cart 10 may be stored in a minimum of space. The cart may still be wheeled to a storage area after it has been collapsed.

It may be possible to eliminate rods 50 and 50' by providing a special basket 60 having lateral stops means associated with the bottom surface thereof. The lateral stops means could take the form of downwardly depending members which engage spaced rods 30 and 32 or abut the rods 30 and 32 thus preventing lateral shifting of the basket.

The present invention may be embodied in other specific forms without departing from the spirit or essential attributes thereof and, accordingly, reference should be made to the appended claims, rather than to the foregoing specification as indicating the scope of the invention.

I claim:

1. A collapsible cart comprising a pair of spaced uprights, a U-shaped member interconnecting said uprights, spaced wheels associated with said uprights adjacent the lowermost ends thereof, a lower support and an upper support, means pivotally connecting said upper and lower supports at one portion thereof for movement between operative positions and inoperative collapsible positions, said upper support including a pair of spaced rods, said rods defining a surface upon which a receptacle can be supported, means associated with said spaced rods for preventing said receptacle from being jarred from said upper support, said lower support including a pair of spaced rods, said spaced rods defining a surface upon which a receptacle can be supported, means associated with said lower support spaced rods for preventing said receptacle from being jarred from said lower support, said spaced rods including means at their ends adjacent the pivot connection for abuttingly engaging said uprights when said supports are in their operative positions.

2. A collapsible cart as set forth in claim 1 wherein said upper support includes a cross rod secured to and extending between said upper support spaced rods, said cross rod having means associated therewith for preventing lateral shifting of a receptacle placed on said upper support, said cross rod means and said upper support spaced rod means cooperating to prevent shifting of a receptacle placed on said upper support.

3. A collapsible cart as set forth in claim 1 wherein said lower support includes a cross rod secured to and extending between said lower support spaced rods, said cross rod having means associated therewith for preventing lateral shifting of a receptacle placed on said lower support.

4. A collapsible cart as set forth in claim 1 wherein said upper support includes a cross rod secured to and extending between said upper support spaced rods, said cross rod having means associated therewith for preventing lateral shifting of a receptacle placed on said upper support, said lower support including a cross rod secured to and extending between said lower support spaced rods, said lower support cross rod having means associated therewith for preventing lateral shifting of a receptacle placed on said lower support.

5. A collapsible cart as set forth in claim 1 wherein said U-shaped member is integral with said uprights, said U-shaped member being at an angle with respect to said uprights and comprising a handle for said collapsible cart, and a utility receptacle secured to said U-shaped member.

6. A collapsible cart as set forth in claim 5 wherein said utility receptacle has a flap covering the opening thereof, said lower support including positive locking means preventing inadvertent collapsing of said lower support into inoperative position.

7. A collapsible cart as set forth in claim 1 wherein said lower support includes floor engaging means associated therewith, said floor engaging means being secured to said lower surface spaced rods, said means associated with said upper support spaced rods and said means associated with said lower surface support rods comprising curved ends on said rods adapted to engage receptacles on said supports.

8. A collapsible cart as set forth in claim 1 wherein said means associated with said upper support spaced rods and said means associated with said lower surface support rods comprises curved ends on said rods adapted to engage receptacles on said supports so that receptacles must be lifted so that they can be removed from said supports, a cross rod secured to and extending between said upper support spaced rods, said cross rod having upwardly curved ends to prevent lateral shifting of a receptacle on said upper support, a cross rod secured to and extending between said lower support spaced rods, said lower support cross rod having upwardly curved ends to prevent lateral shifting of a receptacle on said lower support.

* * * * *